US010177914B1

(12) United States Patent
Lee

(10) Patent No.: US 10,177,914 B1
(45) Date of Patent: Jan. 8, 2019

(54) DEVICE FOR INTEGRATING MULTIPLE SECURE NETWORKS

(71) Applicant: Fuse Integration, Inc., San Diego, CA (US)

(72) Inventor: Sumner H. Lee, San Diego, CA (US)

(73) Assignee: FUSE INTEGRATION, INC., San Diego, CA (US)

( * ) Notice: Subject to any disclaimer, the term of this patent is extended or adjusted under 35 U.S.C. 154(b) by 91 days.

(21) Appl. No.: 15/286,220

(22) Filed: Oct. 5, 2016

Related U.S. Application Data

(63) Continuation of application No. 15/166,998, filed on May 27, 2016, now Pat. No. 15,166,998.

(60) Provisional application No. 62/274,037, filed on Dec. 31, 2015, provisional application No. 62/170,685, filed on Jun. 4, 2015.

(51) Int. Cl.
*H04L 29/00* (2006.01)
*H04L 9/32* (2006.01)
*H04L 29/06* (2006.01)

(52) U.S. Cl.
CPC ............ *H04L 9/32* (2013.01); *H04L 63/0227* (2013.01); *H04L 63/0428* (2013.01)

(58) Field of Classification Search
CPC .... H04L 9/32; H04L 63/0227; H04L 63/0428
USPC .......................................................... 713/153
See application file for complete search history.

(56) References Cited

U.S. PATENT DOCUMENTS 5,570,270 A * 10/1996 Naedel .................... G06F 1/182
165/104.33
5,726,866 A * 3/1998 Allen ...................... G06F 1/182
361/725
5,777,400 A 7/1998 Bouthillier
8,646,108 B2 * 2/2014 Shiakallis ............... G06F 21/86
361/724

(Continued)

FOREIGN PATENT DOCUMENTS

WO 97/08839 A2 3/1997

OTHER PUBLICATIONS

Loffink. "Dell PowerEdge M1000e Modular Enclosure Architecture." Jan. 2008. http://www.dell.com/downloads/global/products/pedge/en/pedge_m1000e_white_paper.pdf. Accessed Mar. 4, 2016.

(Continued)

*Primary Examiner* — Brandon S Hoffman
*Assistant Examiner* — Michael D Anderson
(74) *Attorney, Agent, or Firm* — Procopio, Cory, Hargreaves & Savitch LLP

(57) ABSTRACT

The device and system for secure network communications disclosed herein can simultaneously operate one or more secure computing components in a single housing and integrating multiple secure networks. The device can operate networking and other software applications. The disclosed device can have physically and electromagnetically separated computing components in separate enclosures within the device, with physical attributes of the device designed to minimize spurious electronic emissions between enclosures. The device can have one or more shielded covers allowing removal and replacement of computing components within each enclosure. The device can allow simultaneous operations of multiple electromagnetically separated enclosures for multiple secure computers in a single space to integrate multiple secure networks.

10 Claims, 8 Drawing Sheets

(56) References Cited

U.S. PATENT DOCUMENTS

| | | |
|---|---|---|
| 9,100,361 B1 | 8/2015 | Lucchesi et al. |
| 2004/0180653 A1 | 9/2004 | Royalty |
| 2009/0052154 A1 | 2/2009 | Wilber et al. |
| 2011/0267765 A1 | 11/2011 | Fuchs et al. |
| 2013/0091589 A1 | 4/2013 | Shiakallis et al. |
| 2013/0257468 A1 | 10/2013 | Mlinarsky |
| 2015/0125158 A1 | 5/2015 | El-Ahmadi et al. |

OTHER PUBLICATIONS

General Micro Systems. "Rugged Box Embeds Dual Computers for Secure/Non-Secure Systems." Oct. 2013. http://www.cotsjournalonline.com/articles/view/103645. Accessed Mar. 4, 2016.

\* cited by examiner

US 10,177,914 B1

DEVICE FOR INTEGRATING MULTIPLE SECURE NETWORKS

CROSS REFERENCE TO RELATED APPLICATIONS

This application is a continuation application of U.S. application Ser. No. 15/166,998, filed May 27, 2016, entitled "DEVICE FOR INTEGRATING MULTIPLE SECURE NETWORKS," which claims the benefit of priority to U.S. Provisional Application 62/170,685, filed Jun. 4, 2015, entitled "SYSTEM AND METHOD FOR INTEGRATING MULTIPLE SECURITY NETWORK SYSTEMS," and U.S. Provisional Application 62/274,037, filed Dec. 31, 2015, entitled "SMALL FORM FACTOR SECURE NETWORKING MODULE FOR INTEGRATING MULTIPLE SECURITY NETWORKS," the entirety of which are hereby incorporated by reference.

BACKGROUND

Technical Field

This disclosure relates to the secure computing and Internet Protocol networking systems in size, weight, and power (SWaP) constrained environments. More specifically, this disclosure relates to systems, methods, and devices for integrating secure networking in mobile platforms such as vehicles, vessels, aircraft, spacecraft, or human carried equipment.

Background

Conservation of SWaP is important in many environments to improve operational efficiency, improve overall system effectiveness, simplify logistics, reduce the workload of personnel or machines, reduce consumption of power, and reduce total cost of ownership. SWaP constrained environments can include mobile platforms such as, for example, vehicles, vessels, aircraft, spacecraft, or human carried equipment. Such environments and platforms may require complex computing, network, and communications equipment. As information processing and networking requirements increase over time, platforms need an ability to increase performance and functionality while maintaining or reducing SWaP consumption.

As requirements for computing equipment increases, operators continue to add more unique devices requiring more space. Electronic processing, data storage, and communications devices consume space and power with addition of each unique capability. As computing and storage capabilities improve the internal components within the unique devices require replacement to maintain competitive parity with state of the art systems. Replacement of internal components within unique devices may require replacement of the entire device, or repair activities that open the sealed enclosure of the device for component replacement.

SUMMARY

This summary is provided to introduce a selection of concepts in a simplified form that are described below in the Detailed Description. This summary is not intended to identify key features or essential features of the claimed subject matter, nor is it intended to be used as an aid in determining the scope of the claimed subject matter.

An aspect of the disclosure provides a device for secure network communications. The device can have a chassis having an electromagnetically sealed exterior. The device can also have a first enclosure within the chassis operable to receive first removable computing components. The device can also have a second enclosure within the chassis electromagnetically isolated from the first enclosure and operable to receive second removable computing components. The device can also have an encryption component operable to couple the first removable computing components to the second removable computing components when inserted in the respective first enclosure and second enclosure. The device can also have one or more shielded covers coupled to the chassis and operable to provide access to the first enclosure and the second enclosure when opened. The cover can make an electromagnetic seal with the chassis and maintain electromagnetic isolation of the first enclosure and the second enclosure when closed. The device can also have one or more external interfaces for connection to one or more external computing components.

Another aspect of the disclosure provides a system for secure network communications. The system can have a first computing enclave operably coupled to a first network. The first network can have a first encryption. The system can also have a second computing enclave operably coupled to a second network. The first computing enclave can be electromagnetically isolated from the first computing enclave. The second network can have a second encryption different from the first encryption. The system can also have an encryption device operably coupled to the first computing enclave and the second computing enclave. The encryption device can securely transfer data between the first computing enclave and the second computing enclave according to the first encryption and the second encryption.

Other features and advantages of the present disclosure should be apparent from the following description which illustrates, by way of example, aspects of the disclosure.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
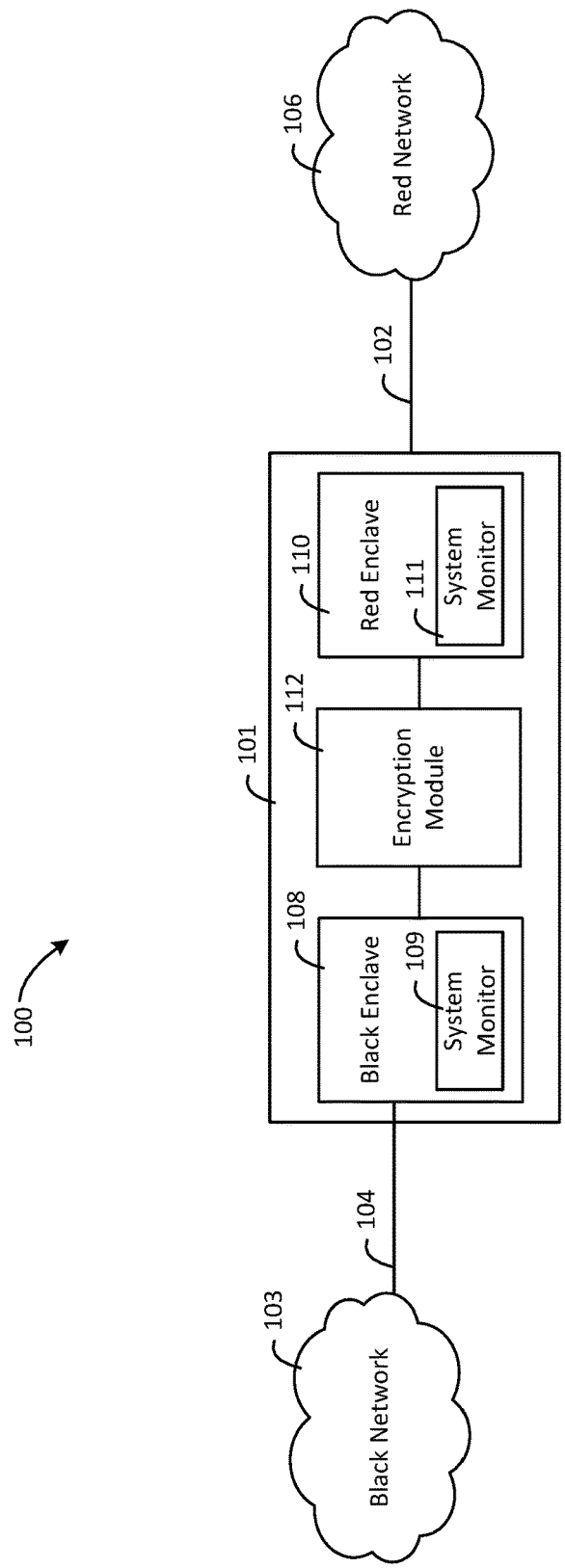
FIG. 1 is a functional block diagram of an embodiment of a system for secure networking.

Devices and systems for computing and Internet Protocol networking systems are described herein. In particular, the system can have an integrated, small, lightweight, ruggedized networking appliance, combining multiple virtual components into a single physical device.

The disclosed system and device can simultaneously operate one or more secure computing components in a single housing and integrates multiple secure networks. The disclosed components can operate networking and other software applications. The disclosed components are physically and electromagnetically separated in separate enclosures within the device, with physical attributes of the device designed to minimize spurious electronic emissions between enclosures. The separate enclosures each include a shielded cover over an opening that allows the user to remove and replace computing components within each enclosure. The ability to quickly remove and replace computing components while maintaining electromagnetic separation of the enclosures lets users run multiple secure computers in a single space that can integrate multiple secure networks. The single device integrating multiple secure networks gives users a capability to insert network systems into environments that previously could not sustain the requisite networking components. This system and device provides secure network connectivity to vehicles, aircraft, and dismounted personnel in ways that were not previously available.

The disclosed system and device can implement IP routing, switching, firewall, network optimization, system monitoring, and other computing functions for multiple network enclaves separated by one or more encryptors or encryption components. This disclosure provides a system that is able to securely connect a fixed or mobile user to public or other open communications systems (such as 3G or 4G cellular, microwave, UHF, VHF, SATCOM, Ethernet, cable, etc.) and provide a secure network enclave that keeps user data separated from public data. The device is further capable of expanding to communications capabilities to follow-on systems such as 5G, IEEE 802.11, and 802.16, among many other wired and wireless communication systems.

The disclosed system can provide electronic security of virtualized network communications systems. The system can further provide a secure computing or networking module that combines at least two secure computing or networking enclaves within a single physical device while maintaining physical and electromagnetic separation of the enclaves. In particular, the disclosure describes an enclosure for computing devices used to perform secure information processing, communications and networking that requires physical and electromagnetic separation between the multiple components housed within individual enclosures within the device.

The components within each enclosure of the device can provide for information processing, information storage, communication, or networking functions including but not limited to routing, switching, optimization, and firewall protection. The components may include one or more processors, one or more memories or data storage devices, radios, or other components not specifically contemplated by this disclosure. Secure computing and networking systems in these environments may require electromagnetic isolation between computing components when the components process or hold sensitive information.

The ability to physically and electromagnetically separate multiple secure computing enclaves within platforms in SWaP constrained environments is important to allowing platform users to function in tactical, operational, and commercial scenarios. Secure network communications and the ability to secure information moving over multiple networks is paramount to users. Users separately account for and operate each enclosure as a separate device even when interconnected through encryption subsystems. Electromagnetic isolation of computing components for the enclave within each enclosure is required to maintain secure separation of information.

As used herein, "enclave" or "computing enclave" can refer generally to a computing environment within an enclosure. The computing environment can include computing and communication processes conducted by one or more computing components occurring within an enclosure, as described below.

As used herein, "electromagnetic isolation" can refer to the limitation of spurious emissions, or radio frequencies not deliberately created, transmitted, or intended to be transmitted from the enclave systems inside the enclosure. Electromagnetic isolation can, for example, minimize the correlation between radiated energy or detectable emissions and any data that might be processed, stored, or moved through the enclosure.

FIG. 1 is a functional block diagram of an embodiment of a system for secure networking (system). A system 100 can provide networking and computing functions for multiple security levels existing in the same physical enclosure with particularly low SWaP requirements. The system 100 can have a secure networking device (device) 101. In some embodiments, the device 101 can achieve the SWaP requirements by condensing multiple networking components within a single virtual environment utilizing a single physical processor architecture with multiple processor cores. The secure networking device can have two or more computing enclaves shown as a black enclave 108 and a red enclave 110. The black enclave 108 and the red enclave 110 can be joined by an encryption module 112. The encryption module 112 can have a commercial, or National Security Agency (NSA) level encryption and certification. The encryption module 112 can be an encryption device, system, or group of devices capable of transferring data between the black enclave 108 and the red enclave 110 according to one or more encryption protocols or processes.

The secure networking device 101 can be communicatively coupled to a black network 103. The black network 103 can be, for example, an unclassified network, a public network, or a network having a lower classification level. In some embodiments, external data can flow from the black network 103 (e.g. the Internet or other unclassified or public network) and via one or more communication paths to a network interface 104 into a black network port of the secure networking device 101. The network interface 104 represents one or multiple simultaneous interfaces to the black network. The external data can be intended for either a black enclave 108 or a red enclave 110. In some embodiments, more than two enclaves may be present in the device 101. The colors red and black as used herein may be used herein to designate different networks which may be secured according to various or different classification levels. For example, the red enclave 110 may be for use with a classified system (e.g., SIPRNET) and the black enclave 108 may be designated for use with an unclassified network (e.g., NIPRNET, or a Public network). Other levels of classification and additional (e.g., three or more) enclaves are also contemplated by this disclosure.

The secure networking device 101 can be communicatively coupled to a red network 106. In some embodiments, external data can flow from the red network 106 (e.g. a private network) and via one or more communication paths to a network interface 102 (e.g., a red network port) of the secure networking device 101. The network interface 102 can represent one or multiple simultaneous interfaces to the red network. The external data can be intended for either the red enclave 110 or the black enclave 108.

External data intended for the black enclave 108 is processed within the black enclave 108 by virtualized computing components such as a router, Wide Area Network (WAN) Optimizer, System Monitor or other server or computing component. Data intended for the red enclave 110 can be IP-routed to the red enclave 110 via an encryption module 112. The encryption module 112 can be a computing component configured to decrypt (or unencrypt) the data for processing by various virtualized computing components within the red enclave 110 including but not limited to a WAN Optimizer, Router, Firewall, System Monitor or other server computing component. The red enclave 110 can further be coupled to a red network 106 through one or more connections. The black enclave 108 and the red enclave 110 can be electromagnetically (EM) isolated from one another. The EM isolation can allow unification of distinct enclaves within the same physical enclosure (e.g., the device 101) but with separate virtualization environments.

In some embodiments, any data intended for the black network 103, including data sourced from the red network 106 or red enclave 110 can be routed through the encryption module 112 for encryption. The outbound data can then be IP-routed to the black network 103 via the black enclave 108 network path.

In some embodiments, the device 101 can have multiple enclaves (e.g., the black enclave 108 and the red enclave 110) each having a distinct security classification level. Each enclave can reside on an individual virtualized environment separated by an encryption module 112. In some embodiments, the encryption module 112 can have a commercial or NSA-approved encryption. For example, one virtualized environment can handle all Unclassified-level computing (e.g., the black enclave 108) while a separate virtualized environment may handle all Secret-level computing (e.g., the red enclave 110). In some embodiments additional enclaves may also move information into other enclaves through additional encryption modules (e.g., the encryption module 112).

Figure 2:
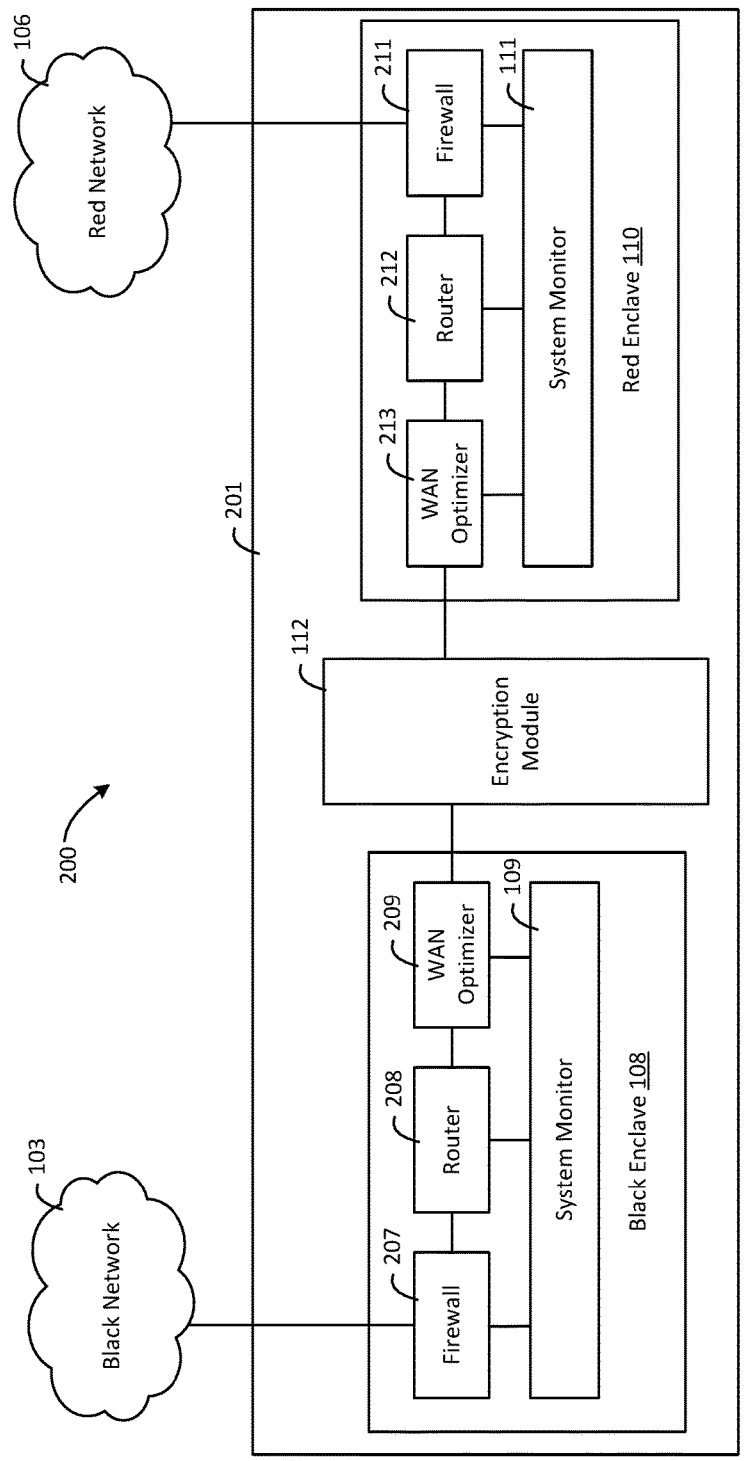
FIG. 2 is a functional block diagram of an embodiment of a device for secure networking of the system of FIG. 1.

FIG. 2 is a functional block diagram of another embodiment of the secure networking system of FIG. 1. A secure networking system 200 can have a secure networking device (device) 201. The device 201 can be similar to the device 101 and can have multiple computing enclaves. The device 201 can have, for example, the black enclave 108 and the red enclave 110. The black enclave 108 and the red enclave 110 can be distinct computing or networking systems. The system 200 can further be similar to the system 100, incorporating the black network 103 and the red network 106.

In some embodiments, each of the black enclave 108 and the red enclave 110 can have a respective system monitor 109, 111. The system monitors 109, 111 can each have a system management tool which can provide configuration management and monitoring of the computing functions within its respective enclave.

In some embodiments, data can flow from external networks via one or more of a variety of communications links (e.g. Satellite Communications (SATCOM), Radio Frequencies (RF), and Ethernet) to the device 201. Data may flow through communications links within the black network 103 and the red network 106. Data can be filtered and inspected at an internal firewall 207, and 211. In some embodiments, firewall functions can be provided by a commercial firewall subsystem. In some other embodiments, the firewall functions can be provided by a virtualized firewall software. The firewall 207 and 211 can have certain security protocols in place such as an Intrusion Protection System (IPS). IPS services can ensure that only authorized information is passed through the device 201. Data destined for the black enclave 108 can then be securely forwarded to a router 208. The router 208 can also provide routing information, routing capabilities, and enforce any Quality of Service (QoS), and other policies on inbound and outbound traffic.

In some embodiments, the device 201 can also have a WAN Optimizer 209. The WAN optimizer can provide certain data flow optimization services such as TCP acceleration, compression, caching, and de-duplication, in addition to marking the different TCP protocols with Differentiated Service Code Points (DSCP) markings, to any TCP data traversing the path. Notably, data can flow through the chain of components described by a certified system administrator in the specific order defined by the administrator, and the administrator can change the order of components to suit their specific needs. Any local data, that is, data related to the black enclave 108 can be processed by computing components within the black enclave 108.

In some embodiments, the black enclave 108 and the red enclave 110 can include both processing and data storage components. For example, black enclave 108 and the red enclave 110 can have one or more processors coupled to one or more memories. The one or more processors can run the computing components required by the administrator (e.g. WAN Optimizer, Router, Firewall, System Monitor). The physical components may be attached to each other, or reside within discrete internal components. Some or all of the physical components corresponding to the black enclave 108 and the red enclave 110 may be removable from their respective enclosures.

In some embodiments, data destined for the red enclave 110, can be routed through the components in the black enclave 108 because the data payloads are encrypted by the encryption module 112. The encryption module 112 can randomize payload data coming from one enclave as it passes it to the other enclave yet maintains the addressability of payload source and destination as well as other discrete data regarding the payload (e.g. Differentiated Services Code Point (DSCP) markings). The module can utilize an encryption key allowing external systems connected to the network to decrypt (or unencrypt) the payload data. The encryption module 112 can allow multiple security enclaves to be connected to each other while maintaining controlled separation of information. The data received by the black enclave 108 can be routed through the firewall 207, the router 208, and the WAN optimizer 209 to an encryption module 112. The encryption module 112 can decrypt the incoming data payloads for the red enclave 110. In a similar manner, the encryption module 112 can encrypt any outbound data transmitted back through the black enclave 108. Once the data payload has been decrypted, the data can be forwarded into the subsequent enclave. The red enclave 110 can have a firewall 211, a router 212, and a WAN optimizer 213 similar to the firewall 207, a router 208, and a WAN optimizer 209. Each of the black enclave 108 and the red enclave 110 can have system monitoring components (system monitor) 109, 111. The system monitors 109, 111 can monitor the real-time configuration information for each of the components for the respective enclave. The system monitors 109, 111 can then send that configuration information to an external remote server located outside the system on the red network or the black network. The external remote server may let users observe information regarding configuration of computing components within the device.

In some other embodiments, a single system monitor (e.g., the system monitors 109, 111) can be used to provide configuration management and monitoring of the network functions and performance in all enclaves residing within the invention using an NSA-approved data guard, such as, for example, Radiant Mercury.

In some other embodiments, the order of execution or performance of the operations illustrated and described herein is not essential, unless otherwise specified. That is, the operations may be performed in any order, unless otherwise specified and some embodiments of the invention may include additional or fewer operations than those disclosed herein. For example, it is contemplated that executing or performing a particular operation before, contemporaneously with, or after another operation is within the scope of the aspects of the invention.

Figure 3:
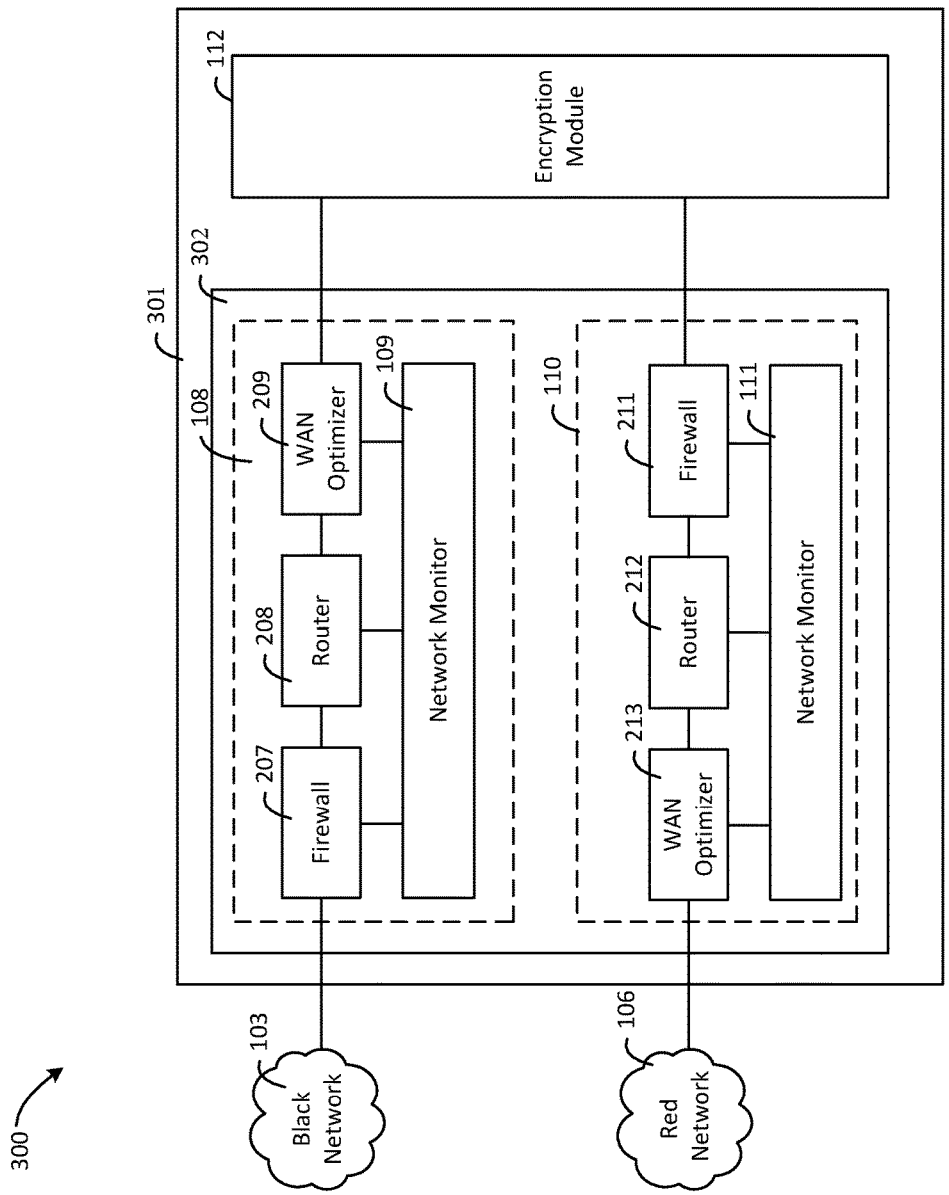
FIG. 3 is a functional block diagram of another embodiment of the device for secure networking of the system of FIG. 1.

FIG. 3 is another functional block diagram of another embodiment of the secure networking system of FIG. 1. A system 300 can have a secure networking device (device) 301 and a computer 302. The computer 302 can host multiple computing enclaves, such as the black enclave 108 and the red enclave 110. In some embodiments, the device 301 can have more than two distinct enclaves. The black enclave 108 and the red enclave 110 are shown in dashed lines and can have similar features as described above.

The device 301 can also have the encryption module 112. The encryption module 112 can be operable to provide encryption and decryption processes, similar to that described above. In some embodiments, the device 301 can reduce device physical requirements by hosting the black enclave 108 and the red enclave 110 with a single computer.

Figure 4:
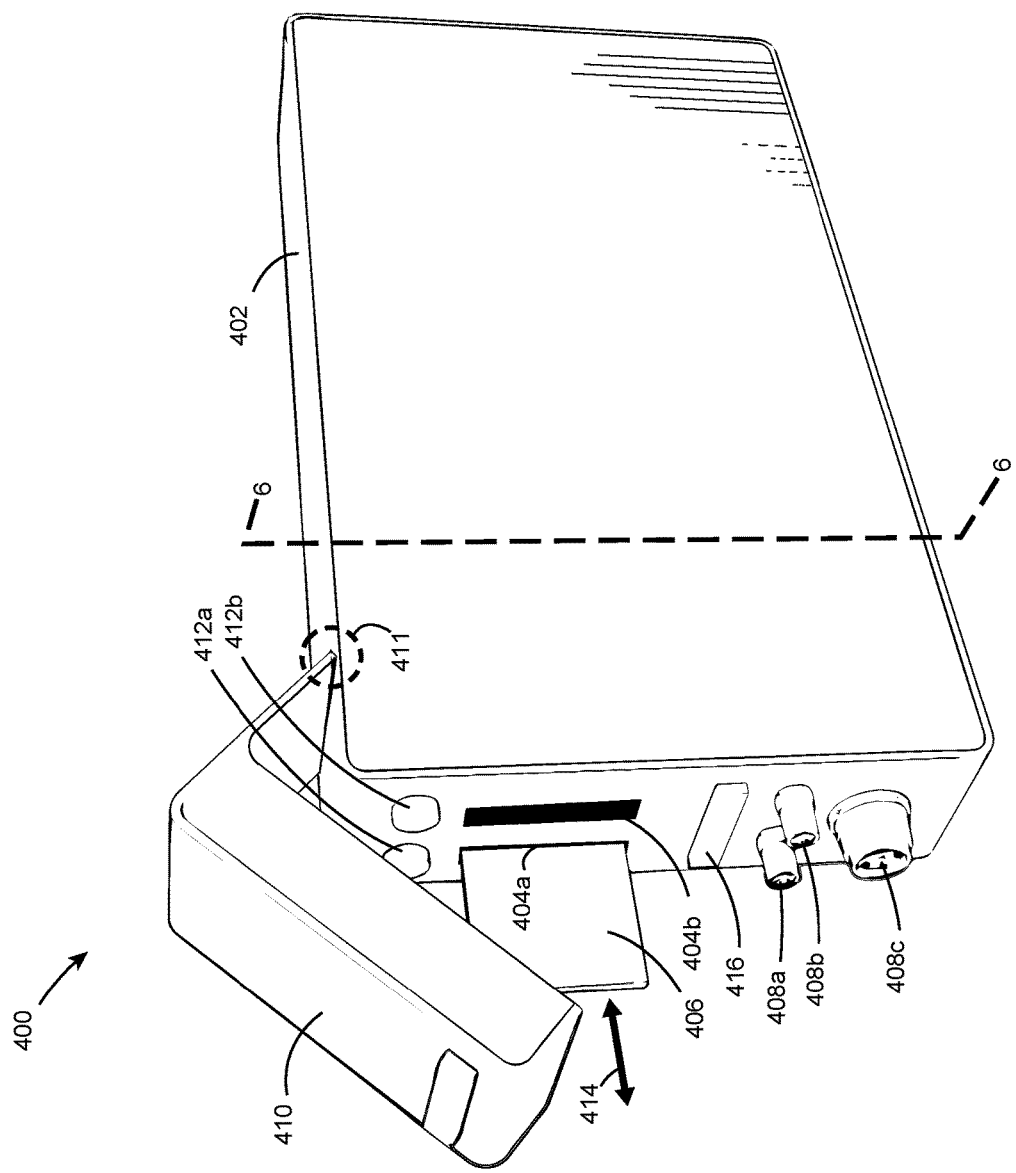
FIG. 4 is a perspective view of an embodiment of a device for secure computing.

FIG. 4 is a perspective view of an embodiment of a device for secure computing. A device 400 can have a housing or chassis 402. The chassis 402 can be formed or otherwise be constructed from an electrically conductive material. In some embodiments, the chassis 402 can be electromagnetically hardened or otherwise electromagnetically sealed to reduce any spurious electromagnetic emissions or unintended electromagnetic emissions from, for example, various components of the device 101. The chassis 402 can have certain provisions for mounting internal and external components. Internal components may be fully enclosed within the chassis 402 and electromagnetically separated from the environment, yet may be removable by administrators. Various external components may be attached to the chassis to facilitate removal. The shape and size of the device 400 and the chassis 402 illustrated in this figure is for reference only and not intended to limit the shape or size of removable components within the module.

The chassis 402 can be an outer shell that can house at least two electromagnetically separated enclosures (FIG. 6), each associated with an enclave (e.g., the black enclave 108 and the red enclave 110) for electronic equipment. The chassis 402 can provide a rigid structure for mounting in vehicles or other locations. The chassis 402 can also provide external interfaces for power, electronic communications, RF communications, visual communications, cooling and removable components as described below.

In some embodiments, the chassis can be 2.25 inches wide and fall within industry standard limitations for ARINC Air Transport Rack (ATR) enclosures. In some embodiments, the device 400 can be a one-quarter (¼) ATR form factor as illustrated in FIG. 4 or larger or smaller than ¼ ATR in width. In some embodiments, the chassis 402 can have other physical forms depending on the number of enclaves and specific computing components within each enclave. The device 400 can be embodied in commercial 19-inch wide racks, or other physical form factors.

The device can have one or more slots 404 to accept one or more removable computing components 406. Two slots are shown, labeled 404a and 404b. The slot 404a is shown with the removable computing component 406 partially inserted. While not shown in this figure, the slot 404b is also adapted to receive a removable computing component (e.g., the removable computing component 406). The removable computing components 406 can be removable processors or other removable media for use in, for example, the black enclave 108 and the red enclave 110. For example, the black enclave 108 can be associated with processing and networking connected to the removable computing component 406 in the slot 404a. As another example, the red enclave 110 may be associated with processing and networking connected to removable computing component 406 in the slot 404b. Similarly, the chassis 402 can be divided into two or more enclosures 470, and 480. The enclosures 470 and 480 may be referred to herein as the physically separated portions of the device 400. The enclosures 470 and 480 are more clearly shown on either side of the device 400 in FIG. 6. The enclosures 470, 480 may be referred to herein as a first enclosure and a second enclosure, however this is not intended to limit the number of enclosures that can be present in the device 101.

The device 400 can also have individual power switches 412a and 412b (collectively switches 412) for the removable computing components 406 within each enclave. These switches 412 can be located on the chassis 402 and may also have wiring connectors or other provisions available to remotely actuate the switches 412 of the removable computing components 406.

The device 400 can also have a shielded cover 410. The shielded cover 410 can be coupled to the chassis by a hinge assembly 411 (shown in dashed lines). The hinge assembly 411 can allow a user to rotate the shielded cover 410 to allow access to insert or remove the removable computing components 406 in the directions indicated by a double-ended arrow 414. The switches 412 are shown positioned under the shielded cover 410, however in some embodiments, the switches 412 may be positioned outside of the shielded cover 410. The chassis 402 can also have a catch 416 that can allow the user to open or secure the shielded cover 410. The catch 416 can be formed or constructed to receive a latch 417 and secure the shielded cover in place. The position of the shielded cover 410 over the slots 404 and the removable computing components 406 can provide electromagnetic shielding to the various components of the device 400 (e.g., the removable computing components 406 inserted in the slots 404). As described below, the shielded cover 410 can make precise and electrically conductive and/or metal-to-metal contact with the chassis 402. In some embodiments, the electrically conductive contact can include overlap of one or more edges of the shielded cover 410 to mitigate transmission of electromagnetic signals through or around the edges. This can increase the electromagnetic isolation properties of the device 400.

In some embodiments, the device 400 can have one or more external interfaces 408. The external interfaces 408 are labeled as 408a, 408b, and 408c, but may be collectively referred to herein as the external interfaces 408. The external interfaces 408 can correspond to interfaces 104 and 102 in FIG. 1 and provide means by which the intended user can exchange data with computing components within each enclave. The external interfaces 408 can include, for example, Ethernet, serial, and RF communications ports, universal serial bus ports, and accessory connectors and communication ports. In some embodiments, the external interfaces 408 can be ruggedized locking circular connectors for connections having multiple wires as shown in FIG. 4. The external interfaces 408 can be penetrations through the chassis 402 that allow for fixed wire connections to other computing, networking, and communications devices. In some other embodiments, the external interfaces 408 can also include, but are not limited to, other controls such as a volume control, a channel selector, indicator lights, and a display, etc. The external interfaces 408 may not all be located to the front of the device 400 (as shown) and may be distributed along the sides and back of the device 400 as needed for certain applications. The external interfaces 408 can further include electromagnetic shielding and grounding to ensure electromagnetic isolation of the interior components.

Figure 5:
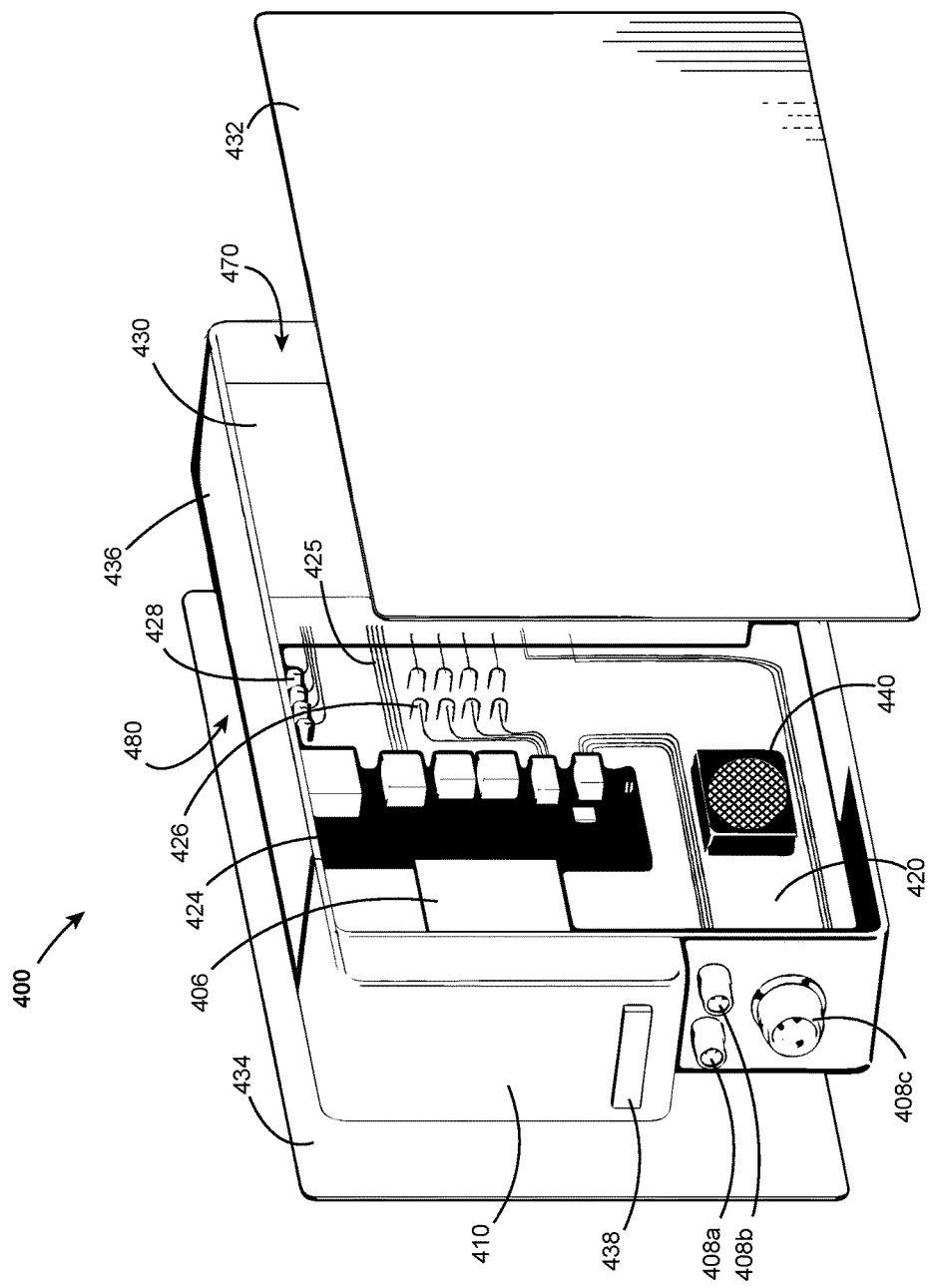
FIG. 5 is an exploded view of the device for secure computing of FIG. 4.

FIG. 5 is an exploded view of the device for secure computing of FIG. 4. The device 400 can have an internal dividing wall 420. The internal dividing wall 420 can provide electromagnetic isolation between adjacent enclosures 470 and 480 within the device 400. The physical structure of the internal dividing wall 420 and the chassis 402, in general, blocks electromagnetic signals from passing from, for example the enclosure 470 to the enclosure 480. The internal dividing wall 420 can be formed of a solid metal or honeycomb structure, cover, metallic paint or lining, metallic tap or filler, metallic mesh, screen, or honeycomb, or other electromagnetic dampening material between the enclosures 470 and 480. The internal dividing wall 420 can also have various interfaces between the enclosures 470, 480 that allow for filtered communications signals through signal filters 426, filtered power flow through power filters 428, and filtered air flow through mesh interference filters 440 as further described below. The interference filters 440 can provide certain filtered interfaces between the first enclosure and the second enclosure (e.g., the enclosures 470, 480). Such interfaces can be mechanically and electrically filtered between the enclosures 470, 480 to provide for shared power, cooling, and information transmission. In some embodiments, the interference filters 440 can operate as high pass, low pass, band pass, or band stop filters with respect to electromagnetic radiation. Accordingly, the interference filters 440 can allow one or more predetermined frequencies or bands of frequencies to pass between the enclosures.

A compartment with an electromagnetically sealed cover allows core computing components to be easily removed from each enclosure. The shielded cover 410 provides electromagnetic isolation from external systems and between internal enclosures when shut.

In some embodiments, the internal dividing wall 420 can also serve as a mounting point for various electronic components 424. The electronic components 424 can be one or more components or circuit boards including one or more processors, memory storage devices, power conditioners and filters, capacitors or batteries, radios, and other components necessary to accomplish the functions of the device 101 (FIG. 1), the device 201 (FIG. 2).

The internal dividing wall 420 can provide physical separation between the enclosures 470 the enclosure 480. In some embodiments, this can be the physical separation and EM isolation between the black enclave 108 and the red enclave 110. The internal dividing wall can allow each of the black enclave 108 and the red enclave 110 to operate independently without interference or spurious electronic or electromagnetic emissions from one another or the external environment. Isolation from spurious electromagnetic emissions reduces the likelihood of compromise of sensitive data by external persons or systems.

In some embodiments, internal computing components, such as the electronic components 424, and their respective removable computing components 406 can be communicatively coupled together through various wires or data buses 425. The internal electronic components 424 can also be routed from one enclosure 470 to another enclosure 480 through one or more signal filters 426. In some embodiments, electrical power can also move between the enclosures 470, 480 via one or more power filters 428. In some embodiments, the power filters 428 can be power conditioners or power rectifiers. In some other embodiments, the power filters 428 can limit the signals traveling via the power supply network to precise frequencies or power signals required for system operation. The power filters 428 can thus prevent certain information or data signals from being transmitted via the power connections. The power filters 428 can isolate the power signals moving in single direction from one enclave to another (e.g., the black enclave 108 to the red enclave 110). For example, information carried by signal modulation can be filtered by the power filters 428 to ensure a sensor positioned outside of the device 400 cannot detect any meaningful modulation of the power signal that could be interpreted as information coming from inside one of the enclosures.

In some embodiments, the device 400 can further have an encryption component 430. The encryption component 430 can be similar to the encryption module 112 (FIG. 1). As described above, the encryption component 430 can decrypt encrypted data passing through the black enclave 108 intended for the red enclave 110 or encrypt data leaving the red enclave 110 for the black enclave 108. The encryption component 430 can therefore enable connections between secure computing components in one enclave (e.g., the red enclave 110), and other computing components having different or no security requirements in the one or more other enclaves (e.g., the black enclave 108). Examples of encryption components may be KG-175D, KG-250X, or KG-250XS HAIPE devices.

The chassis 402 of the device 400 can have an external panel 432 and an external panel 434. The external panels 432, 434 can be affixed or otherwise attached and sealed to a main body 436 to form the chassis 402. The external panels 432, 434 can be affixed to the main body 436 using overlapping edges or electromagnetic gaskets (not shown) to ensure physical and electromagnetic separation (and isolation) of the enclosures 470, 480 from the exterior of the system. In FIG. 5 the shielded cover 410 is shown in the closed position with a latch assembly 438. The latch assembly 438 can include the catch 416 and the latch 417 (FIG. 4). In some other embodiments, certain metallic mesh materials can be implemented in constructing the chassis 402.

The device 400 can also have an opening for air flow between the enclosures 470 and 480 with an electromagnetic interference filter 440 in the internal dividing wall 420. The interference filter can couple adjacent enclaves to provide air flow (e.g., for cooling). The interference filter 440 can maintain electromagnetic separation of the enclosures 470, 480 while allowing air flow between them. The interference filter 440 can allow for air flow between enclosures or between the enclosures and the outside of the device 400 while restricting transmission of electromagnetic waves. In some embodiments, the interference filter 440 can be an electromagnetic interference (EMI) or radiofrequency (RF) filter formed of a metallic mesh. The interference filter 440 can allow air to pass but blocks electromagnetic emissions. The interference filter 440 can be disposed on the inner wall and on the outside of the chassis 402.

Figure 6:
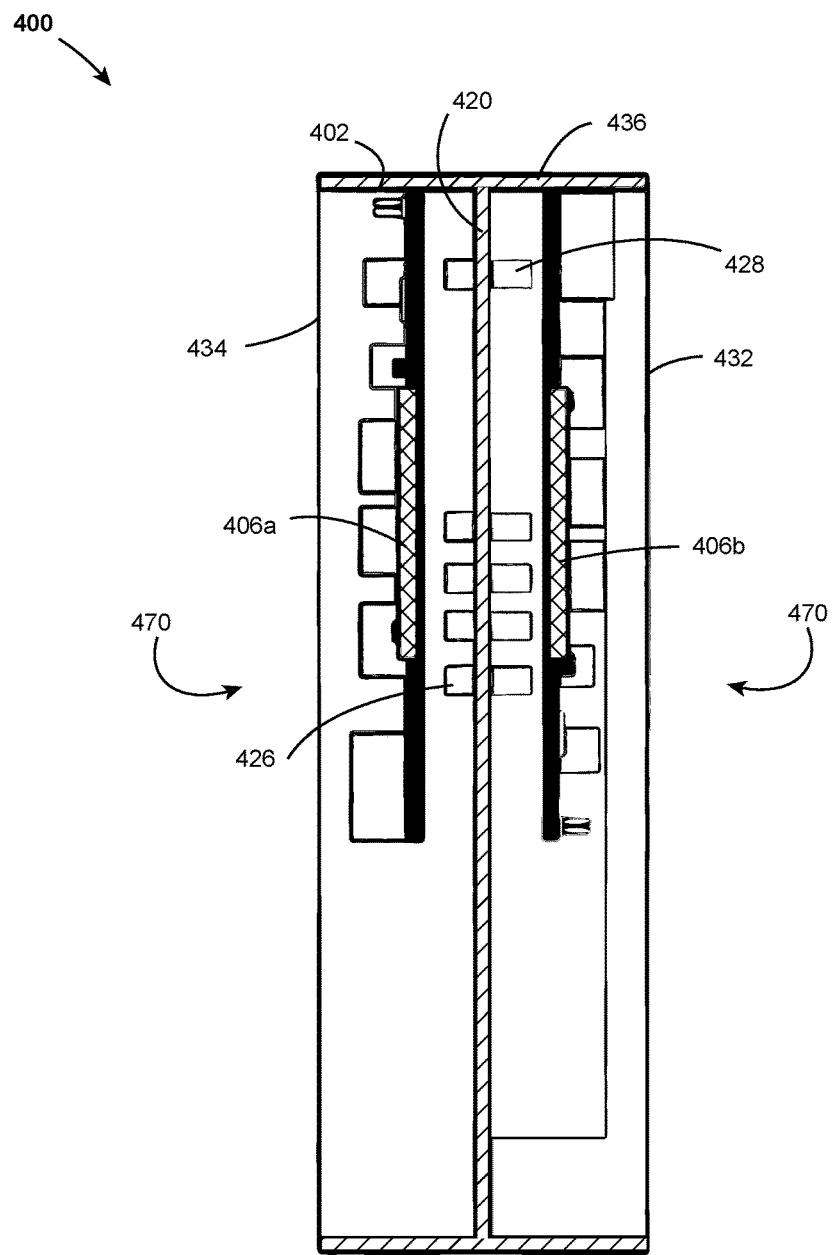
FIG. 6 is a sectional view of the module for secure computing of FIG. 4.

FIG. 6 is a sectional view of the device of FIG. 4 taken along the line 6-6. As shown, the interior of the device 400 is visible, showing the internal dividing wall 420 that separates and electromagnetically isolates the enclosures 470, 480. The internal dividing wall 420 and the main body 436 and the external panels 432, 434 can be formed of conductive metal, plastic with an internal ferrous mesh, or other grounded ferrous material that does not allow for passage of electromagnetic signals from one side to another.

In some embodiments, the power filters 428 can penetrate the internal dividing wall 420 to permit electrical power to transition between enclosures 470, 480. The device can also have one or more signal filters 426 that can penetrate the internal dividing wall 420. The signal filters 426 can allow specific or predetermined signals to be transmitted between the enclosures 470, 480 while blocking other spurious, unwanted, or interfering signals. The external panels 432, 434 are also shown coupled to the main body 436 to form the chassis 402 and seal the enclosures 470, 480 within the device 400. The chassis 402 can then isolate the enclosures 470, 480 and therefore the black enclave 108 and the red enclave 110 from the exterior of the device 400.

In some aspects, the EM isolation provided by the chassis 402, the enclosures 470, 480, and the shielded cover 410 is significant because enclosures can be accessed to expose components for removal and replacement while maintaining EM separation of disparate computing enclaves (e.g., the black enclave 108 and the red enclave 110). This can allow data and configuration changes, hardware system upgrades, and secure storage of sensitive information without having to remove the entire device, or re-certify the enclosure. The shielded cover 410 allows for the enclosures 470 and 480 to be electromagnetically sealed yet easily opened by system administrators for removal and replacement of computing components (e.g., the removable computing components 406). The accessible enclosure is unique in its function and design to allow for sealed compartments with interchangeable components.

Figure 7:
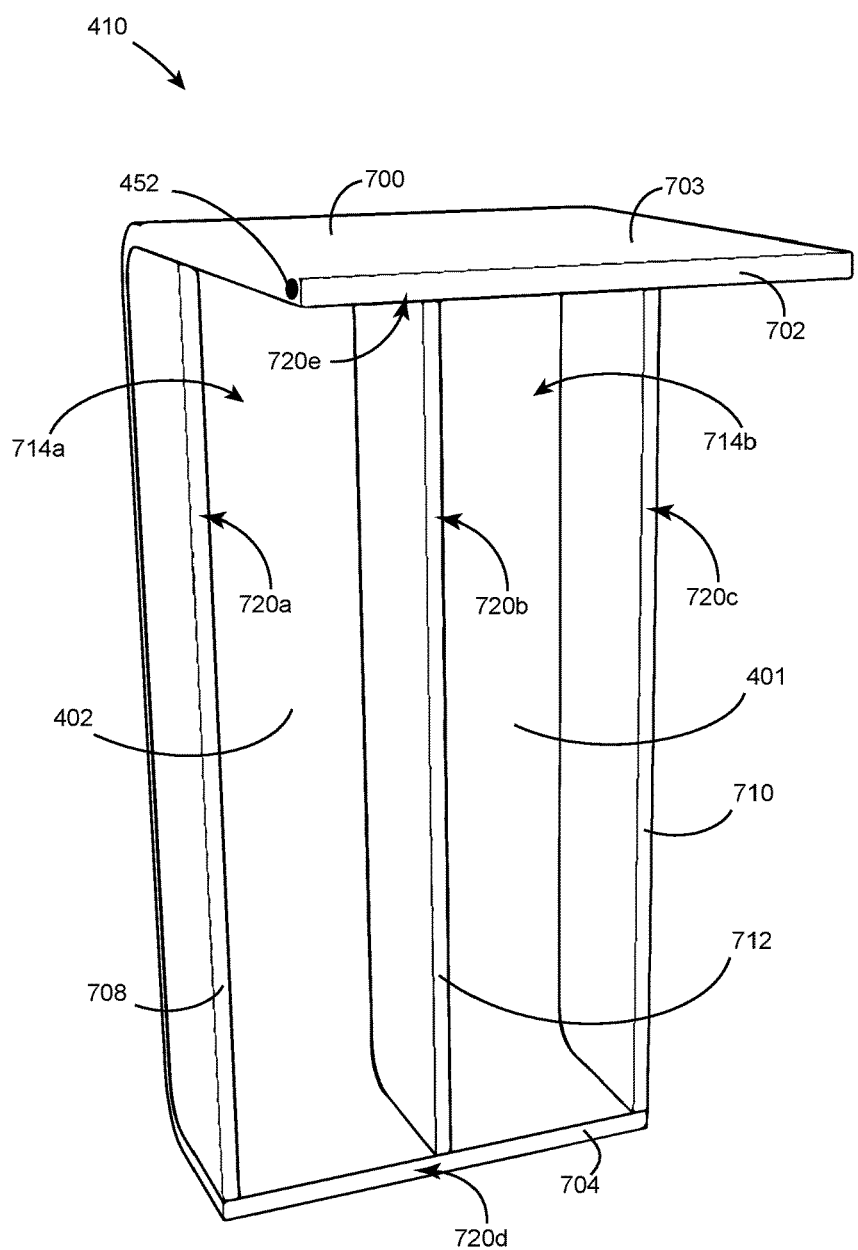
FIG. 7 is a rear view of the shielded cover of the device for secure computing of FIG. 4.

FIG. 7 is a back view of the shielded cover of the device for secure computing of FIG. 4. The shielded cover 410 can have a cover body 700. The cover body 700 can have a hinge end 702 and a cover end 704. In some embodiments, the cover body 700 can have a roughly C-shaped configuration with round corners that join both the hinge end 702 and the cover end 704. The shielded cover 410 can generally cover the slots 404 when closed, and conversely allow access to the slots 404 (e.g., for removal or installation of the removable computing components 406) when open.

The hinge end 702 can have a hinge point 706. The hinge point 706 can be a portion of the hinge assembly 411 (FIG. 4) and provide a point of rotation for the shielded cover 410 for opening and closing the shielded cover 410. The shielded cover 410 can rotate away from the chassis 402 about the hinge point 706 to allow access to the slots 404. In some embodiments, the hinge end 702 can have a hinge end extension 703. The hinge end extension 703 can be disposed flush with the main body 436 when the shielded cover is closed. The hinge end extension 703 can extend a distance 705 away from outer walls 708, 710, described below.

The shielded cover can also have an outer wall 708 and an outer wall 710. The outer walls 708, 710 can be formed or otherwise affixed to the cover body 700 to form the outer portion of the shielded cover 410 and define an interior space. The outer walls 708, 710 can contact the chassis 402 (FIG. 4) when closed to create an electromagnetic seal. The shielded cover 410 can also have one or more dividing walls 712. Only a single dividing wall 712 is shown, but two or more are contemplated by this disclosure. The dividing wall(s) 712 can divide the interior space into two or more interior sections 714. Two interior sections 714a and 714b are shown but additional interior sections 714 can be present where more than one dividing wall 712 is present. In some embodiments, the number of interior sections 714 can correspond to the number of enclaves (e.g., the black enclave 108 and the red enclave 110) and the number of enclosures 470, 480 (or the slots 404) present in the device 400. The interior sections 714 of the shielded cover 410 can envelop and isolate each of the enclosures 470, 480 when the shielded cover 410 is closed.

In some embodiments, the shielded cover 410 can be constructed of the multiple components described above. In some other embodiments, the shielded cover 410 can be a unitary component (e.g., forged, cast, welded, etc.). In other embodiments the cover may be separated by enclosure or enclave.

The shielded cover 410 can maintain physical and electromagnetic separation of the enclosure 470, 480 with the internal dividing wall 420. The shielded cover 410 can also maintain external physical and electromagnetic separation from the external environment with the cover body 700 and the outer walls 708, 710.

In some embodiments, the surface of the outer walls 708, 710 and the surface of the dividing wall 412 can be in direct contact the chassis 402 (FIG. 4) with overlapping seams when the shielded cover 410 is closed and latched. The outer walls 708, 710 and the dividing wall can have contact surfaces 720. The contact surfaces 720 are labeled as contact surfaces 720a, 720b, 720c, 720d, 720e, but are generally referred to collectively as contact surfaces 720. Contact between the chassis 402 and the contact surfaces 720 of the shielded cover (e.g., the surfaces of the outer walls 708, 710 and the diving wall 712) can provide electrical continuity. For example, the contact surface 720b can come into contact with the chassis 402 in an area of the chassis 402 between the slots 404 while the contact surfaces 720a, 720b contact the chassis 402 on the outer edges near the external panels 432, 434. This electrical continuity between the shielded cover 410 and the chassis 402 can increase the electromagnetic isolation of the enclosures 470, 480. The latch assembly 438 can further provide a positive locking function to maintain contact between the contact surfaces 720 and the chassis 402 when the shielded cover 410 is closed. The locked contact of the shielded cover 410 and the chassis 402 with overlap of seams restricts spurious electromagnetic emissions from internal components to the outside environment.

In another embodiment, the shielded cover 410 can be formed as one or more flat panels that can rotate or slide to from a physical and electromagnetic seal over the enclosures when closed, yet allow access to components within the enclosure for easy removal and replacement when open. Some embodiments can include metal or other materials. The cover or hatch may be built as hinged door or a plate, a sliding plate, or a removable plate that is secured with fasteners.

Figure 8:
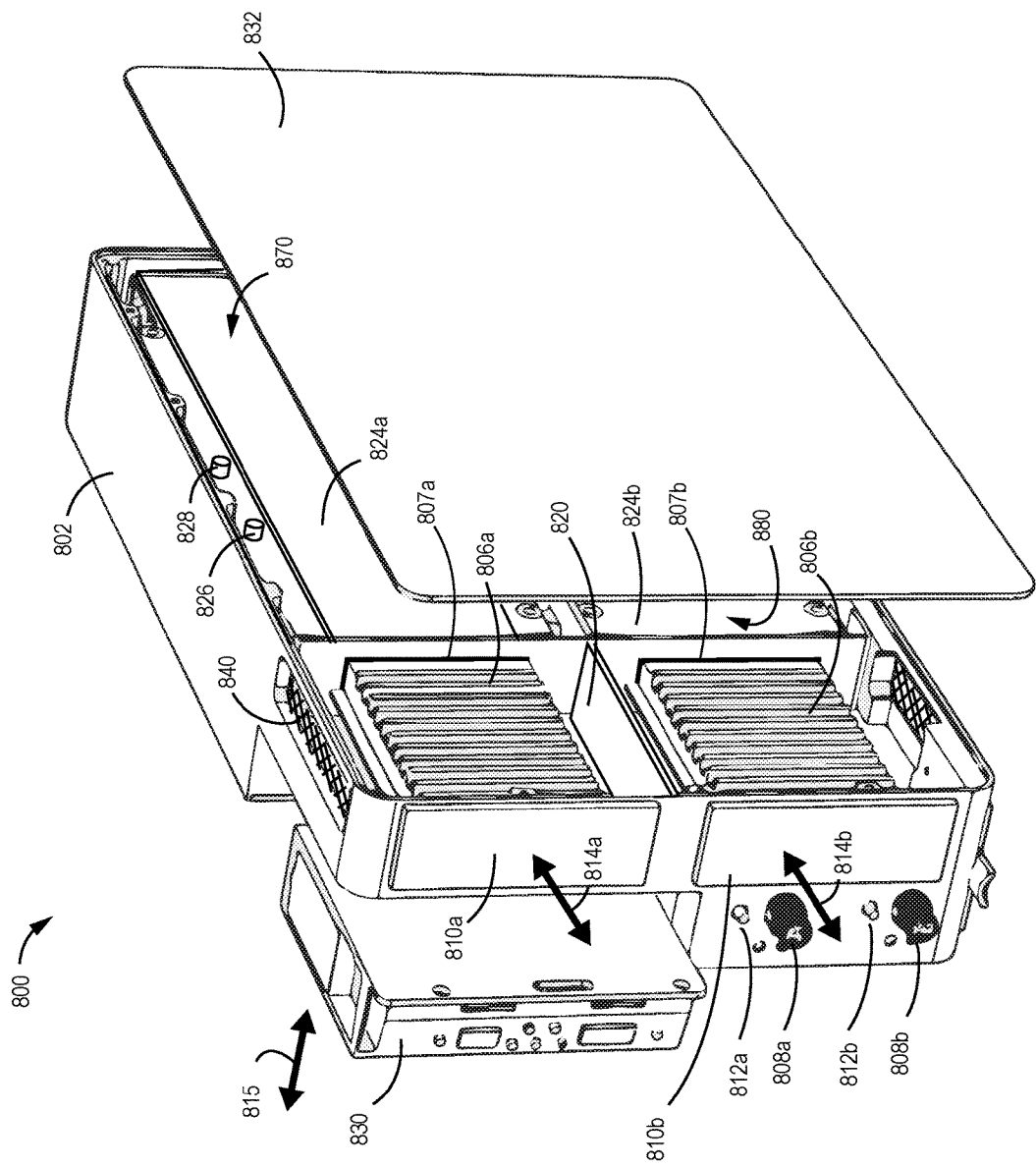
FIG. 8 is an exploded view of another embodiment of a device for secure computing.

FIG. 8 is an exploded view of an additional embodiment of a device for secure networking and computing. A device 800 can be similar to the device 400 (FIG. 4), having a chassis 802 having two electromagnetically separated enclosures 870, and 880 for containing computing components. The device 800 can have two shielded covers 810a, 810b (collectively, shielded covers 810) for each enclosure 870, 880. The enclosures 870 and 880 can contain internal circuit card assemblies 824a and 824b. Similar to the device 400 (FIG. 4), the enclosures 870, and 880 in device 800 can have data interfaces with signal filters 826. The signal filters 826 can restrict transmission of spurious emissions outside of the enclosures 870, 880 while allowing specific data signals to pass through. In some embodiments, the signal filters 826 can be similar to the interference filters 440 (FIG. 5). The specific data signals may be only those signals within a specific frequency range that are required to move information from the components within enclosure 870 to the cryptographic module 830. The device 800 can also have power interfaces with signal filters 828 to restrict the transmission of spurious emissions out of the enclosures 870, 880. Signal filters 828 can allow no data to be transmitted over the power connections from the circuit card assemblies to the power source for the device. The enclosures 870, 880 can also have one or more air interfaces (interfaces) 840 to allow air to flow between the enclosures 870, 880 and to areas outside the device 800. These air interfaces 840 can be fitted with electromagnetic shielding, such as, for example, a mesh that allows air to flow yet restricts electromagnetic emissions. In some examples, the mesh can be a metallic mesh. The device 800 can have circuit card assemblies 824a and 824b (collectively, circuit card assemblies 824) within each enclosure 870, 880. The circuit card assemblies 824 can be connected to removable computing components 806a and 806b. The removable computing components 806a, 806b may be referred to collectively as the removable computing components 806. The removable computing components 806a, 806b can be fully enclosed by the shielded covers 810a and 810b. The shielded covers 810a, 810b and the removable computing components 806a, 806b can be coupled to the enclosures 870 and 880 via one or more electromagnetically conductive gaskets 807a, 807b to restrict spurious emissions from the connection between the card assemblies 824 and the removable computing components 806. The gaskets are made of a conductive material and embedded within the edge of the removable computing components 806a and 806b. When inserted into to the device the gaskets make physical contact with a conductive part of the chassis 802 to block the escape of electromagnetic signals. The removable computing components 806a and 806b can be removed from the device 800 as illustrated by double ended arrows 814a and 814b.

The removable computing components 806a and 806b can be removed through openings in the chassis 802. In some embodiments, the chassis 802 can be similar to the chassis 402. The chassis 802 can be formed or otherwise be constructed from an electrically conductive material to prevent spurious emissions between enclosures. The chassis 802 can have provisions for mounting internal components (e.g. the electronic components 424) and one or more external components such as an encryption module shown by 830. The external components 830 can be disconnected from the chassis 802 as depicted by double ended arrow 815. A cover 832 can be attached to the chassis 802 with overlapping seams and metal to metal contact to restrict spurious electromagnetic emissions between enclosures 870, 880 or to areas external to the enclosures 870, 880.

The shape and size of the device 800 and the chassis 802 illustrated in this figure is for reference only and not intended to limit the shape or size of removable computing components 806a, 806b within the device 800. External interfaces 808a and 808b may be locking circular connectors or commercial or proprietary connectors to allow for data, power, RF, or other data connections to external networks and systems. Computing components within each enclosure may be activated or deactivated by a power switch 812a and 812b on the chassis and may have wiring for remote placement of switches and indicators. Additional external interfaces may be mounted on the sides or the rear of the chassis to facilitate connection to external systems.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

The above description of the disclosed embodiments is provided to enable any person skilled in the art to make or use the inventions. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

Those of skill will appreciate that the various illustrative functional blocks, modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

The various illustrative functional blocks and modules described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

What is claimed is:

1. A device for secure network communications allowing operation of multiple secure computers in a single space, the device comprising:
    a chassis having an electromagnetically sealed exterior;
    a first enclosure within the chassis operable to receive a first removable computing component having a first processor;
    a second enclosure within the chassis electromagnetically isolated from the first enclosure and operable to receive a second removable computing component having a second processor;
    an encryption component operable to communicatively couple the first removable computing component to the second removable computing component when inserted in the respective first enclosure and second enclosure;
    one or more shielded covers making an electromagnetic seal with an exterior surface of the chassis and maintaining electromagnetic isolation of the first enclosure and the second enclosure when closed, the one or more shielded covers operable to allow removal and replacement of the first computing component and the second computing component while maintaining electromagnetic separation of the first enclosure and the second enclosure; and
    one or more external interfaces for connection to one or more external computing components.

2. The device of claim 1, wherein the first enclosure provides a first computing enclave having a first security encryption and the second enclosure provides a second computing enclave having a second security encryption different from the first security encryption.

3. The device of claim 1, wherein the chassis has a one quarter air transport rack (ATR) form factor.

4. The device of claim 1, wherein the chassis has a 19-inch rack server form factor.

5. The device of claim 1, further comprising one or more electronic interference filters coupling the first enclosure and the second enclosure, the one or more electronic interference filters allowing transmission of information at a predetermined frequency and minimizing transmission of unintended electromagnetic signals between the first enclosure and the second enclosure.

6. The device of claim 1, further comprising one or more interference filters coupling the first enclosure and the second enclosure, the one or more interference filters allowing air circulation but minimizing transmission of electromagnetic signals between the first enclosure and the second enclosure.

7. The device of claim 1, further comprising one or more air interfaces disposed within the chassis, the one or more air interfaces having a mesh that permits air to pass between the first enclosure and the second enclosure and restricts electromagnetic emissions between the first enclosure and the second enclosure.

8. A system for secure network communications comprising:
    a first computing enclave in a first enclosure configured to receive a first removable computing device having a first processor and a first memory, the first computing enclave operably coupled to a first network, the first network having a first encryption;
    a second computing enclave in a second enclosure adjacent the first enclosure and configured to receive a second removable computing device having a second processor and a second memory, the first computing enclave operably coupled to a second network and being electromagnetically isolated from the first computing enclave, the second network having a second encryption different from the first encryption;
    an encryption device operably coupled to the first computing enclave and the second computing enclave and configured to securely transfer data between the first computing enclave and the second computing enclave according to the first encryption and the second encryption; and
    a chassis housing the first enclosure and the second enclosure, and having
        a first cover operable to be coupled to the chassis and providing an electromagnetic seal for the first enclave and configured to allow removal and replacement of the first computing device, and
        a second cover operable to be coupled to the chassis and providing an electromagnetic seal for the second enclave, and configured to allow removal and replacement of the second computing device while maintaining electromagnetic separation of the first enclosure and the second enclosure.

9. The device of claim 8, wherein the first enclosure provides a first computing enclave having a first security encryption and the second enclosure provides a second computing enclave having a second security encryption different from the first security encryption.

10. The device of claim 8, wherein the chassis has a one quarter air transport rack (ATR) form factor.

* * * * *